ent [19]

United States Patent
Cochran et al.

[11] 3,830,128
[45] Aug. 20, 1974

[54] FILM CUTTER AND VIEWER FOR DYNAMIC TOMOGRAPHY

[75] Inventors: Gary D. Cochran; David A. Crosby; Peter A. Franken; Lloyd O. Crabtree, all of Ann Arbor, Mich.

[73] Assignee: CFC Products, Inc., Ann Arbor, Mich.

[22] Filed: Nov. 26, 1971

[21] Appl. No.: 202,331

[52] U.S. Cl. ............... 83/451, 83/519, 83/522, 83/614
[51] Int. Cl. ............................. B26d 3/12
[58] Field of Search .......... 83/374, 451, 513, 519, 83/614, 522; 33/80, 77

[56] References Cited
UNITED STATES PATENTS

| | | | |
|---|---|---|---|
| 429,203 | 6/1890 | Sajous | 33/80 |
| 1,374,363 | 4/1921 | Davis | 33/80 |
| 1,985,259 | 12/1934 | McIlroy et al. | 33/80 X |
| 2,520,904 | 9/1950 | Boehm, Jr. | 33/80 X |
| 2,665,757 | 1/1954 | Stevens et al. | 83/614 X |

Primary Examiner—J. M. Meister
Attorney, Agent, or Firm—Reising, Ethington and Perry

[57] ABSTRACT

Apparatus is disclosed for cutting and viewing a set of radiograph films for use in the practice of dynamic tomography. Each radiograph film includes recorded data thereon indicative of the direction of track motion during exposure of the film and indicative of the angle of exposure at which the particular film was made. The cutting apparatus is provided with means for holding the film in given position and adjustably positionable cutter guides. With the cutter guides positioned in accordance with the data on a given film, cutters are effective to cut the film with parallel reference sides at a given altitude and with parallel angle sides at a given width. The cutter mechanism includes movable carriers for a parallelogram linkage having a lost motion connection therein. The viewer for the film set is of the film shift type and holds a set of films in superimposed relationship so that operation of a film shift mechanism enables the selection of a desired plane for viewing. The film shift viewer is provided with a shift mechanism including a cam element which is properly correlated in design with the parallelogram pivot linkage of the cutting apparatus so that proper alignment of the films can be achieved.

16 Claims, 24 Drawing Figures

INVENTORS
Gary D. Cochran,
David A. Crosby,
Peter A. Franken &
Lloyd O. Crabtree
McGlynn, Reising, Milton & Ethington
ATTORNEYS

INVENTORS
Gary D. Cochran,
BY David A. Crosby,
Peter A. Franken &
Lloyd O. Crabtree
McGlynn, Reising, Milton & Ethington
ATTORNEYS

FILM CUTTER AND VIEWER FOR DYNAMIC TOMOGRAPHY

This invention relates to dynamic tomography and more particularly to apparatus for cutting and viewing a set of radiograph films for dynamic tomography.

Dynamic tomography is a technique for producing a set of radiographic records of an object which, when properly combined, enable the reproduction of images of any selected plane or lamina within the volume of interest in a manner which obliterates interfering shadows and thus produces a virtual focus of the image of the selected plane. Dynamic tomography, which is sometimes referred to as variable depth laminagraphy, is described in U.S. Pat. No. 3,499,146 granted to Albert G. Richards on Mar. 3, 1971 for "Variable Depth Laminagraphy with Means for Highlighting the Detail of Selected Lamina." As described in this reference, dynamic tomography is carried out by a tomographic movement of the X-ray source and film, with the effective pivot point of the linkage being disposed in a plane through the object. Multiple exposures are made at different angles through the object, with separate images being recorded on separate films for each different angle, to produce a set of radiographs. The set of radiographs may then be superimposed in a stack for viewing and, with the radiographs aligned so that the images of a given point in the object all coincide, all other points, or object details in the same plane, will be revealed in an unobstructed view; images of all points lying in other planes, even closely adjacent planes, will be obliterated. Assuming, for instance, the use of cut films with the image of a given point in the reference plane falling at the center of each film for each exposure angle, a virtual focus of the reference plane is achieved and the images of the given point are superimposed when the radiographs are superimposed directly on top of each other. If the given point lies between the reference plane and the film, the images of the given point on the respective radiographs will be superimposed and the plane through the given point will be brought into virtual focus when the radiographs are shifted relative to each other in one direction parallel to the tomographic movement, i.e., the track direction. On the other hand, if the given point lies between the reference plane and the source, the images of the given point will be superimposed with the respective radiographs shifted relative to each other in the opposite direction parallel to the tomographic movement. Any desired plane may be brought into virtual focus by relative shifting of the set of radiographs to superimpose the images of a point lying in the plane of interest. In this relationship of the radiographs, the multiple images on the different radiographs of the same point reinforce each other, while a given point in any other plane is imaged on different radiographs at nonaligned positions and the resulting image is, therefore, blurred to the extent that it merely forms a background for the points in the reference plane. Dynamic tomography may be practiced with a plane tomographic movement of the type mentioned above. A different form of tomographic movement may also be used in which the film is fixed in position and the X-ray source is movable along a predetermined path with an axis of the beam intersecting the same point in the film plane for all positions of the X-ray head. This latter tomographic movement is utilized in a system wherein the object is movable in a substantially synchronous manner with the X-ray source, as described and claimed in copending application Ser. No. 202,494 entitled "Dynamic Tomography with Movable Table" filed on even date herewith and assigned to the same assignee as the present invention.

The practice of dynamic tomography has been greatly advanced by the use of radiograph sets in which each radiograph film is shaped as a parallelogram to facilitate the relative shifting of the films to select the desired plane for viewing. The technique of cutting and viewing parallelogram-shaped films is described and claimed in U.S. Pat. application Ser. No. 78,880 filed Oct. 7, 1970 by Albert G. Richards for "Method and Apparatus for Variable Depth Laminagraphy." In this technique the radiographs are formed on conventional X-ray film which is preferably rectangular cut film or suitably roll film in a conventional film holder. The radiographs are provided during exposure with data which represents sufficient information to define the proper orientation relative to the image and the angularity of a parallelogram, which will enable the relative shifting of the set of film to select a desired plane for viewing. A pair of track markers, such as lead balls, are disposed adjacent the object and are on a line parallel to the tomographic movement, i.e. the track direction. A cross-marker is disposed in a plane nearer the X-ray source and is laterally offset from the track markers so that its image falls on the film in a position relative to one of the track markers so that the line therethrough defines an angle indicative of or corresponding to the angle of exposure of the film. After development of the film, the images of the track markers define a line in a direction of track motion and hence the direction of relative shifting which the radiographs must undergo in the selection of a given plane for viewing. Accordingly, the films cut with "reference sides," parallel to the track line and spaced a fixed distance apart, i.e., at constant altitude. The image of the cross marker and one of the track markers enables the establishment of a line which corresponds to the angularity and which enables the "angle sides" of the parallelogram to be cut parallel thereto. The "angle sides" of all of the films of a given set have different angles relative to the reference sides and are spaced apart a fixed width.

Although the use of radiograph film sets in the form of parallelogram films has proved to be highly successful for facilitating the viewing of the desired planes, there has been a need for improvement in the apparatus for cutting the films. In particular, it is desirable to provide cutting equipment to reduce the time required for cutting the film and at the same time to insure that the parallelogram angles correspond precisely, by a known or determinable function, with the angle of exposure. It is desirable to effect the cutting of the parallelogram films with a minimum requirement for human operator judgment in determining the position and angle of the cuts and hence, to accomplish the operation in a semiautomatic machine. In this connection a very significant requisite is that the cutting operation be properly correlated with the manipulation of the parallelogram films in the radiograph viewer so that misalignment and undesired blurring does not occur when the radiologist examines a set of radiographs.

In accordance with the invention, a parallelogram cutter for radiograph films is provided which is adapted to cut a set of constant altitude and width, variable angle, parallelograms according to data thereon representing the orientation and angle of cut. This is accomplished by a cutter comprising a support member adapted to receive a film and having a cutter guide extending in a direction parallel to a fiduciary line with which the film is aligned, whereby the film may be cut along reference sides to establish a given altitude of the parallelogram. First and second carriers are movable on the support member in a direction parallel to the fiduciary line and a second cutter guide is pivotally supported on each of siad carriers with a lost motion connection, so that the carriers may be positioned to establish the second cutter guide according to the angle of the desired parallelogram, whereby the angle sides may be cut. It is to be noted that in a certain form of radiograph viewer the feed mechanism, referred to as gravity feed, requires only one of the angle sides to be cut which may also be done in accordance with this invention. Preferably, however, the invention is carried out by a parallelogram cutter, in which the first cutter guide means enables the cutting of the reference sides of the parallelogram at constant altitude in a single pass of a cutter mechanism. Additionally the angle sides of the parallelogram are established simultaneously by a second cutter guide means which comprises first and second cutter guides linked together, as in a parallelogram linkage with lost motion connection, so that the altitude and width of the parallelogram remains constant for all angles of the parallelogram sides.

Further, in accordance with the invention, the cutting operation is effected with cutting apparatus which operates on a film which is held fixed against movement in the plane of the film and the cutting of the reference sides to establish the fixed altitude, is performed by a first pair of cutters on a track table and the cutting of the angle sides of the parallelogram is performed on a cross table. The cutting operations are performed sequentially with the first cut being made with the film held in an upper level on the track table and then after withdrawal of the track table the film is moved normal to its plane to a second level on the cross table for executing the angle cuts of the film. The film is supported upon a movable platen or chuck and is secured, preferably by vacuum, against lateral movement thereon. The cutting apparatus is suitably operated in a semiautomatic fashion, so that it is only necessary for a human operator to position the film on the platen and the track table, in accordance with the track data thereon, and to establish the parallelogram angles by adjustment of cursors on the parallelogram linkage in accordance with the angle data on the film. The cutting operation of the track sides of the film is effected by operation of the track cutters on the track table and the cutting of the angle sides is effected by operation of the cross cutters on the cross tables of the apparatus.

In accordance with the invention, the establishment of the angle sides of the parallelogram films is correlated with the film shift mechanism of the associated radiograph viewer, to insure that the radiographs are properly aligned during examination.

The film shift mechanism uses a pair of spaced pins or cams which engage the angle sides of the parallelogram films at opposite points on each of the films. Since the cam element must be of finite diameter, each of the films is engaged by the surface of the element at a different point. In order that a pin or a cam element of substantial dimension may be used for coacting with the film edges, while avoiding misalignment of the film set in viewer stack due to the different contact points, it has been found that the cutter guide means for the angle sides of the parallelogram films must be positioned so that the angle sides are offset by an amount depending upon the angularity of the parallelogram. This is accomplished by utilizing a pivotal mount for the cutter guide means, so that the cutting edge is rotated about a radius equal to the radius of the cam element of the viewing device.

A more complete understanding of this invention may be obtained from the detailed description which follows, taken with the accompanying drawings, in which.

Figure 1:
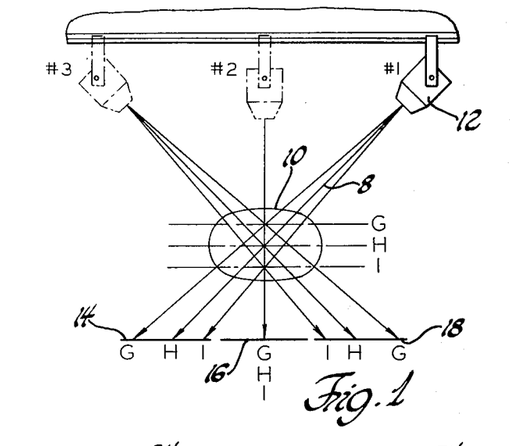
FIG. 1 is a diagrammatic representation of apparatus for making a set of radiograph films for use in dynamic tomography.

Referring now to the drawings, there is shown an illustrative embodiment of the invention in a parallelogram film cutter and viewer for use in the practice of dynamic tomography. For explanatory purposes, FIG. 1 is a diagram of apparatus for making a set of radiographs by a linear tomographic movement. The object 10 to be radiographed is suitably supported between the X-ray source 12 and the film 14. In the object 10 points G. H and I have been identified as lying in the respective planes of interest. In the particular tomographic movement illustrated the X-ray source 12 and the film holder are movable in such a manner that an axis 8 of the X-ray beam passes through the point H and intercepts the same point on the film holder for all different positions of the source and the holder. Thus, in the position number 1 the film 14 is exposed with the images of the points G, H and I occurring in that order from left to right. With the X-ray source in position number 2 the images of the points G, H and I coincide at a single point on the film 16. With the source at position number 3 the film 18 is exposed with the images of the points G, H and I falling on the film in that order from right to left. For discussion purposes it will be assumed that the points G, H and I actually have the form of those letters themselves and thus the images of the letters are formed on the films. It will be understood that in the actual practice of dynamic tomography, a set of radiographs usually comprises at least seven films with a set of nine or 10 being common and each of the films is exposed at a different angle. For explanatory purposes only three films are shown in the drawings.

Figure 2:
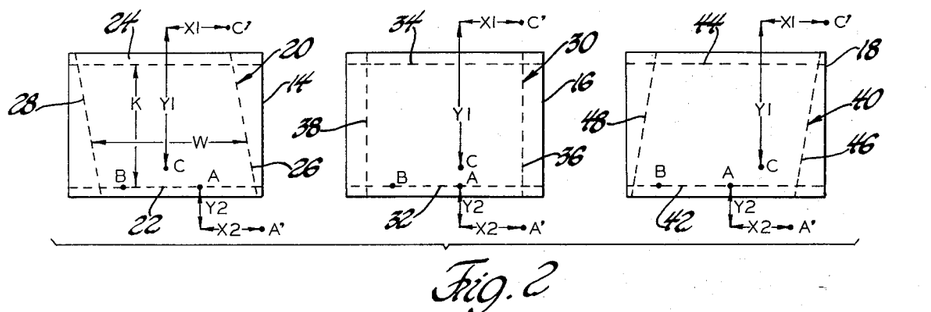
FIG. 2 shows films to be cut into parallelograms.

FIG. 2 shows the set of films 14, 16 and 18 after development with only those images thereon which represent the orientation and angularity of parallelograms to be cut from the film. Each of the films contains marks A, B and C which are in the form of dots and which are the images of markers, suitably small lead balls, positioned adjacent the object during the exposure of the films. The marks A and B, known as the track marks, are suitably formed by a pair of track markers disposed adjacent the lower plane of interest through the object and on a line parallel to the track direction. The mark C is referred to as the cross mark and is the image of a cross marker disposed adjacent the upper plane of interest through the object and is offset laterally from the track markers. As disclosed in the patent application Ser. No. 214,596 entitled "Marker System for Dynamic Tomography", all of the markers may be disposed on the same side of the object and the position of the marks may be translated in position for determining the angularity of the parallograms to be cut. In positioning the set of films relative to each other for viewing, the angularity of the parallelograms relative to each other is important and must be properly established. The absolute angle, however, is not important and it need not be equal to the angle of exposure which the radiograph was made. Accordingly, the cross mark C may be moved, or translated, across the film a given distance $y1$ and may be translated in the track direction a given distance $x1$ to a position C' provided that mark C is identically translated in each other film of the set. In a similar manner, the track mark A is translated in the cross direction by a given distance $y2$ and is translated in the track direction by a given distance $x2$ to the point A'. Likewise, the mark A is translated in each of the other films of the set. The film 14 is then cut into a parallelogram with the first reference side 22 parallel to a line extending through the marks A and B and the other reference side 24 parallel thereto and spaced by an altitude K. The parallelogram is cut with angle side 26 parallel to a line which extends through the translated marks A' and C' and the other angle side 28 is parallel thereto and spaced at a width W. The film 16 is cut in the same manner as the film 14 and it is noted that the reference sides 32 and 34 and the angle sides 36 and 38 intersect at right angles. The film was exposed as shown in FIG. 1 with the source at position number 2 and hence the angle of exposure is perpendicular to the film plane. The film 18 is cut into a parallelogram with reference sides 42 and 44 and angle sides 46 and 48 with an obtuse angle between the reference side 42 and the angle side 46.

Figure 3:
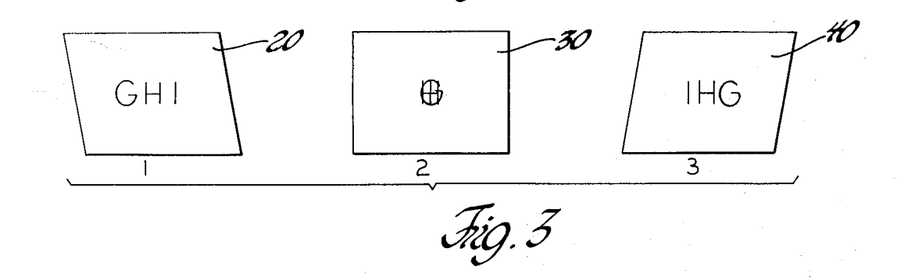
FIG. 3 shows the resulting parallelogram films.
Figure 4:
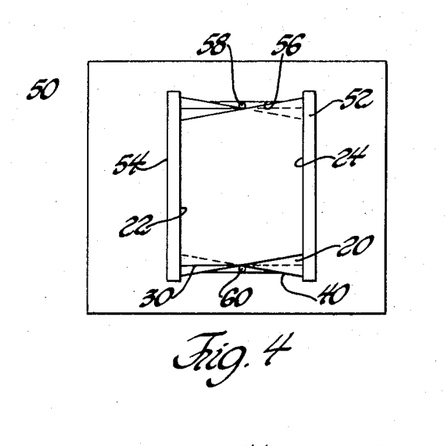
FIG. 4 is a diagram of a set of films mounted or stacked in a radiograph viewer.
Figure 5:
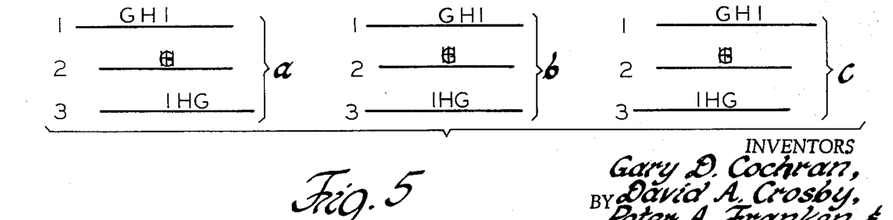
FIG. 5 shows a relationship of the films when shifted to different positions.

The resulting parallelograms 20, 30 and 40 cut from the developed films 14, 16 and 18 respectively, as shown in FIG. 3. It is noted that the images thereon of the points G, H and I lying in different planes, are positioned as described with reference to FIG. 1. In order to view the images of selected planes through the object, the parallelograms 20, 30 and 40 are stacked or superimposed in any desired order. The stack of films may then be disposed on a viewer 50 as shown in FIG. 4. The viewer comprises a pair of guides 52 and 54 disposed on opposite sides of a viewing window 56 and the stack of films is positioned between the guides, with the reference edges, such as 22 and 24, in engagement with the guides. Thus each of the films is constrained to movement in the plane of the film and in the direction of the guides. In order to provide this motion, a pair of cam elements or pins 58 and 60 are disposed a fixed distance apart corresponding to the width of the parallelograms. The cam elements 58 and 60 constitute a part of a film shift mechanism and are constrained to move in unison in paths perpendicular to the guides 52 and 54. When the pins 58 and 60 are moved the films are cammed thereby in a vertical direction to an extent depending upon the angularity of the parallelogram of each film. Accordingly, the films are shifted relative to each other an amount depending upon the position of the pins 58 and 60 between the guides 52 and 54. When the films are shifted relative to each other, as shown in FIG. 5a, the plane containing the point I is brought into virtual focus. The reason for this is apparent from the fact that the images of the point I on each of the films 20, 30 and 40 are all superimposed, therefore reinforcing the image of the point I while the points lying in other planes are not superimposed on each other, and the images thereof are blurred or obliterated. With the films aligned in the viewer as shown in FIG. 5b, the image of the plane containing the point H is brought into virtual focus and with the alignment shown in FIG. 5c the plane containing the image G is brought into virtual focus. It is noted that the planes intermediate the points G, H and I may also be brought into focus by intermediate shifted positions of the films.

Figure 6:
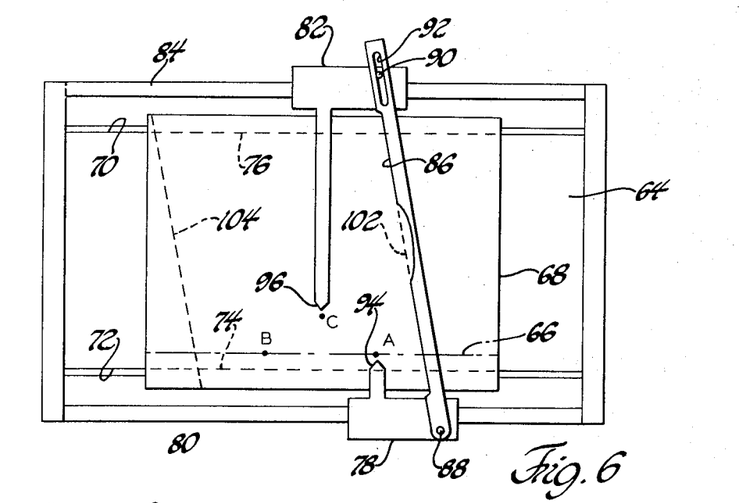
FIG. 6 is a diagrammatic representation of the film cutter.

According to the present invention, apparatus is provided for cutting the films in a set in the manner described above. The inventive cutting apparatus is shown in elementary form and in somewhat diagrammatic fashion in FIG. 6. The apparatus comprises a table 64 having a fiduciary line 66 provided thereon. The table is adapted to support the film 68 with the track marks A and B lying on the fiduciary line 66. The table is provided with pair of spaced parallel cutting edges 70 and 72 which are spaced apart by the fixed altitude distance K desired for the parallelograms; thus the reference edges 74 and 76 of the parallelogram may be cut by suitable blades traversing the cutting edges or guides 70 and 72. In order to cut the angle sides of the parallelogram the apparatus includes a lower carrier 78 mounted on a way 80 for movement in a direction parallel to the fiduciary line 66. An upper carrier 82 is similarly mounted on a way 84 for movement parallel to the fiduciary line. A cutting guide 86 in the form of a lever or link is pivotally mounted on the carrier 78 by a pivot pin 88 and is mounted on the carrier 82 by a pivot pin 90 which coacts with a slot 92 in the link to provide a lost motion connection. The lower carrier 78 is provided with a pointer 94 which is adapted to be aligned with the track mark A to thereby establish the position of the pivot pin 88. The upper carrier 82 is provided with a pointer 96 which is adapted to be aligned with the cross mark C to establish the position of the pivot pin 90. Accordingly, the angularity of the cutting guide 86 is established in correspondence with the angle of exposure of the film 68. The angle side 102 of the parallelogram is cut by running a suitable blade along the cutting guide 86. Although not shown in the simplified structure of FIG. 6, a second cutting guide may be mounted for movement with cutting guide 86, parallel thereto and spaced by a fixed width W to provide for cutting the other angle side 104 of the parallelogram. It can be seen from FIG. 6 that the apparatus could be operated with the carrier 78 fixed in position provided that carrier 82 could undergo sufficient movement along the way 84 to encompass the full span of angularity required for the parallelograms. In this mode of operation the film 68 must be positioned with the track marks A and B lined up on the fiduciary mark 66 and the track mark A lined up on the pointer 94. Similarly, the apparatus could be operated with the carrier 82 fixed in position and initially aligned with the cross mark C, provided that carrier 78 is movable throughout the full span of angularity required. However, as will appear subsequently, this type of parallelogram movement is disadvantageous, especially in apparatus using a pair of cutter guides for the angle cuts, since the full span of angular displacement may result in interference of the holding means for the film.

Figure 7:
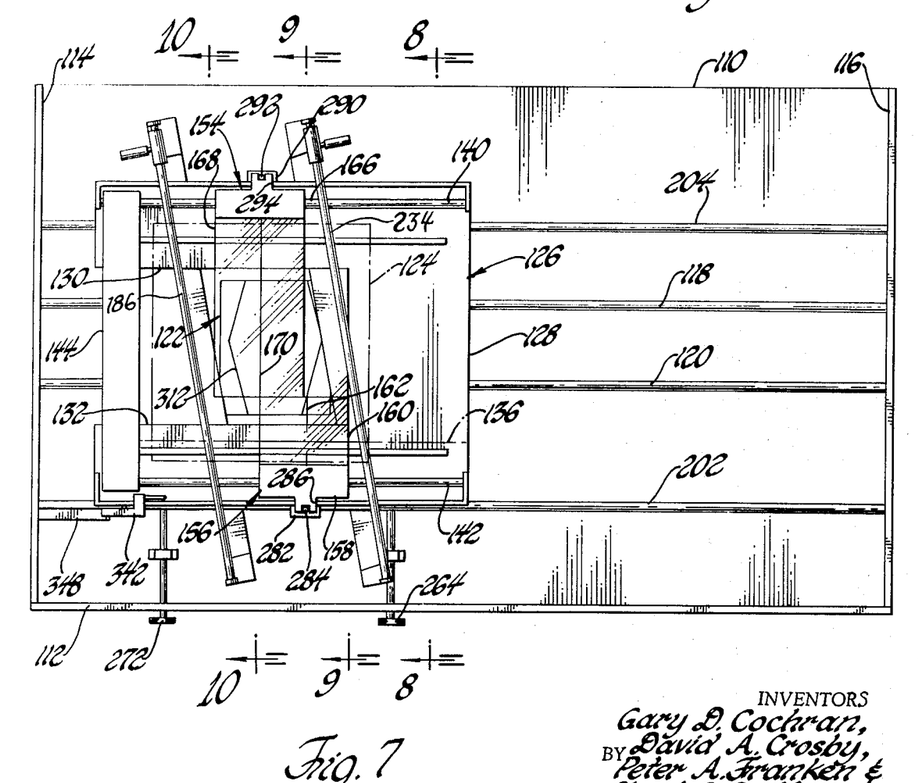
FIG. 7 is a plan view of the film cutter with a film positioned thereon.

Referring now to FIG. 7, the present invention is shown in a semiautomatic apparatus for cutting radiograph films into parallelograms of variable angle with constant altitude and constant width. Since the cutting of a film into a parallelogram necessarily involves intersecting cuts, there is a problem of avoiding interference of one cutter with another. In accordance with this invention, the film to be cut is initially positioned on the cutting apparatus and the apparatus is adjusted so that the angularity of the parallelogram of established. In this condition the reference sides of the parallelogram are cut simultaneously and then the film is moved in a direction normal to its plane to a second cutting position in which the angle sides of the parallelogram are cut.

Figure 8:
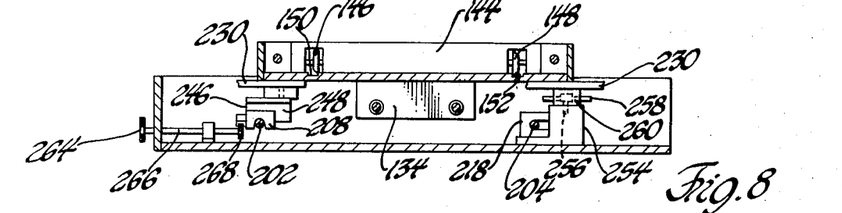
FIG. 8 is a view taken on lines 8—8 of FIG. 7.

As shown in FIG. 7, the apparatus comprises a support table 110 which is provided with a front panel 112 and end panels 114 and 116. A pair of tubular ways 118 and 120 extend between the end panels 114 and 116 and serve to support a film carrier 122 in a manner to be described presently. The film carrier 122 is provided with a film platen 312 which is adapted to accept a film 124 on its upper surface and secure it in place on the platen during the entire cutting operation. In the condition shown in FIG. 7 a track table 126 of U-shaped configuration, i.e., with a base portion 128, an upper leg 130 and a lower leg 132 is movably mounted on the ways 118 and 120 by a carriage 134 (see FIG. 8). As shown in FIG. 7, the U-shaped track table 126 straddles the film platen 312 with the upper surface thereof in the same plane as the upper surface of the platen, so that the film 124 is supported by the platen and the track table. The track table is provided with a fiduciary line 136 which extends parallel to the ways 118 and 120 and the film is positioned thereon so that the track marks are aligned with the fiduciary line. The track table 126 is also provided with pair of ways 140 and 142, suitably of tubular form, which extend parallel to each other from mounting brackets at opposite ends of the track table. A cutter head 144 spans the ways 140 and 142 and is movably mounted thereon by suitable bearings from one end of the table to the other. As shown in FIG. 8, the cutter head 144 carries of pair of cutting wheels 146 and 148 which coact respectively with cutting edges 150 and 152 formed in the surface of the track table. The cutting edges 152 and 150 are, of course, spaced apart a distance equal to the fixed altitude of the parallelograms to be cut and are positioned so as to be covered by the film 124 when it is aligned with the fiduciary line 136.

Figure 9:
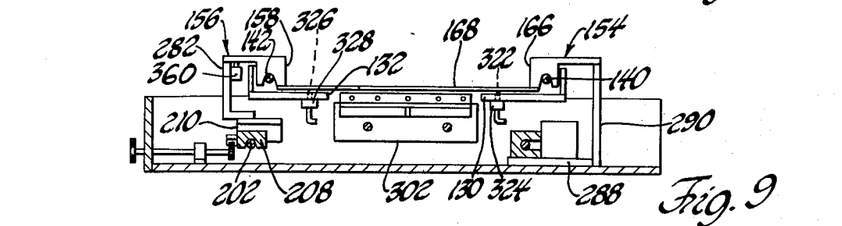
FIG. 9 is a view taken on lines 9—9 of FIG. 7.

For the purpose of adjusting the cutting apparatus to make the angle sides with the desired angularity, there is provided a lower cursor 156 and the upper cursor 154. Referring to the lower cursor 156, it comprises a body 158 which supports a clear plastic plate 160 having a reference line 162 thereon and overlying the upper surface of the track table 126 and the film 14 thereon. As shown in FIG. 9, the body 158 of the cursor is supported on the tubular way 142 for slidable motion thereon. The manner in which the cursor is driven back and forth along the way 142 will be described presently. In a manner similar to that just described, the upper cursor 154 comprises a body 166 which supports a clear plastic plate 168 having a reference line 170 thereon. The body 166 is supported on the tubular way 140 for slidable motion therealong to position the reference line 170 over the cross mark (not shown) on the film 124. The manner in which the cursors are driven along the ways will be described presently.

Figure 10:
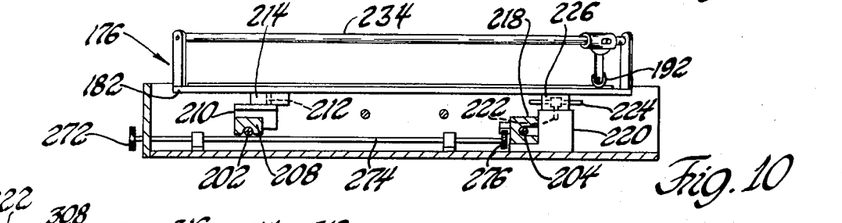
FIG. 10 is a view taken on lines 10—10 of FIG. 7.
Figure 15:
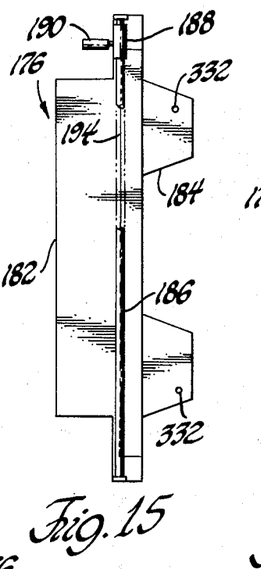
FIG. 15 shows a plan view of the left cross table.
Figure 17:
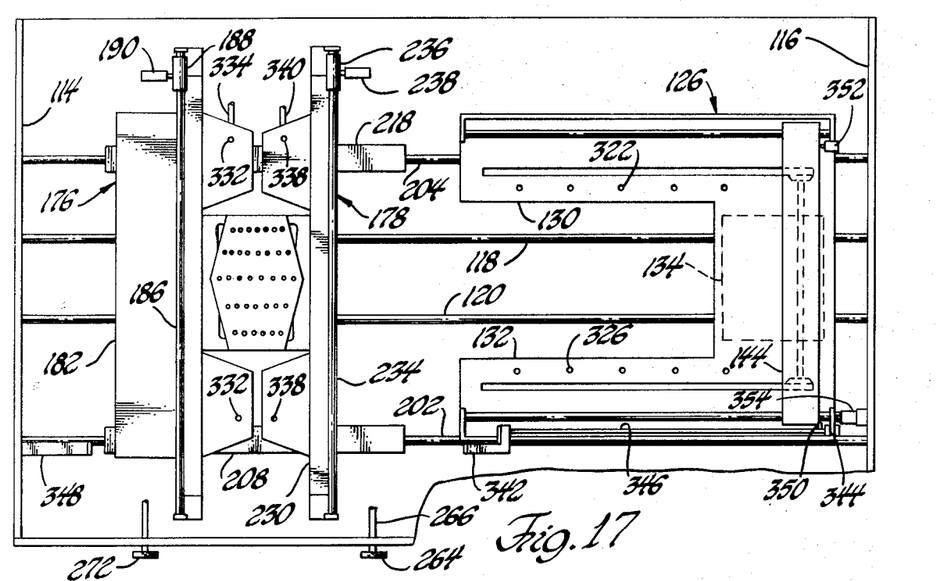
FIG. 17 is a plan view of the film cutter with the track table withdrawn.

At a level just below the track table, a pair of cross tables, namely, a left cross table 176 and a right cross table 178 are provided as shown in FIG. 17 wherein the track table is withdrawn to the right hand position. The left cross table 176, as shown in detail in FIG. 15 comprises a plate 182 which is generally rectangular except for a trough shaped notch 184. The cross table 176 includes a way 186, suitably tubular in form, which extends from front to back of the cross table between a pair of support brackets. The way carries a cutter head 188 with a handle 190 and a cutter wheel 192, depending from the head 188, as shown in FIG. 10. The cutter wheel coacts with a cutting edge 194 and, as shown in FIG. 15, the cutter head 188 is adpated to be moved back and forth across the cross table 176 to cut the angle side of a film positioned thereon.

Figure 12:
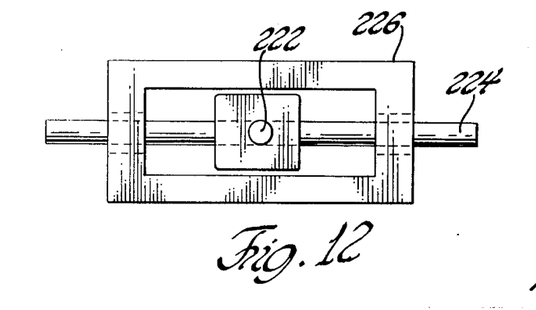
FIG. 12 shows one form of pivotal mount for the cross tables.

The cross table 176 is movably mounted on a pair of ways 202 and 204, suitably tubular, which extends parallel to each other and to the pair of ways 118 and 120 from end panel 114 to end panel 116. In order to support the front end of the cross table 176 on the way 202, a carrier 208 is slidably mounted on the way 202, as shown in FIG. 10, and a mounting block 210 is supported on the carrier and receives a pivot pin 212 mounted in a support block 214 on the lower surface of the plate 182 of the cross table 176. The rear end of the cross table 176 is supported in a similar fashion on the way 204. As shown in FIG. 10, a carrier 218 is slidably mounted on the way 204 and a slide block 220 is secured to the carrier 218 and is slidably mounted on the surface of the table 110 to provide rigid support for the carrier. A pivot pin 222 extends into a suitable bearing in the block 220 and depends from a slide pin 224, which in turn is slidably mounted in a support block 226 mounted on the under surface of the plate 182 of the cross table 176, (see FIG. 12). The pivot pin 222 and the slide pin 224 constitute the functional equivalent of a pin and slot connection between the cross table 176 and the carrier 218 and are effective to provide a lost motion connection therebetween.

Figure 14:
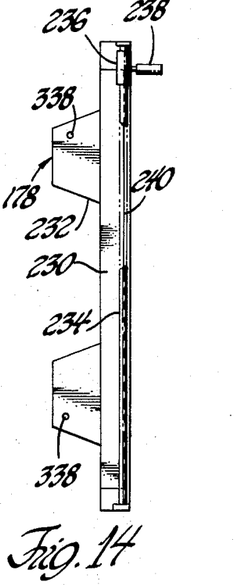
FIG. 14 is a plan view of the right cross table.

In a manner similar to that just described, with reference to the left cross table 176, the right cross table 178 is slidably mounted on the parallel ways 202 and 204. The right cross table 178 comprises, as shown in FIGS. 14 and 17, a flat plate 230 provided with a trough shaped cutout 232 and including a way 234 extending from front to back between a pair of brackets. A cutter head 236 is slidably mounted on the way 234 and includes a handle 238 and a depending cutter wheel (not shown) which coacts with a cutting edge 240 to cut one of the angle sides of a film to form a parallelogram. The front end of the right cross table 178 is supported on the way 202 by the carrier 208, which is slidably mounted on the way, and which carries a support block 246, which receives a pivot pin 248 which depends from the lower surface of the right cross table 178 as described with reference to the corresponding pivotal mounting for the left cross table 176. The rear end of the right cross table 178 is supported on the way 204 by a carrier 218 through the intermediary of a slide block 254 secured to the carrier and slidably mounted on the surface of the table 110 to provide rigid support foor the carrier. The slide block 254 receives a pivot pin 256, which depends from a slide pin 258, which in turn is slidably mounted in a block 260 secured to the lower surface of the right cross table 178. As described with reference to the rear mounting for the left cross table 176, the pivot pin 256 and the slide pin 258 provide the equivalent of a pin and slot connection which affords a lost motion connection between the right cross table 178 and the carrier 252.

Figure 16:
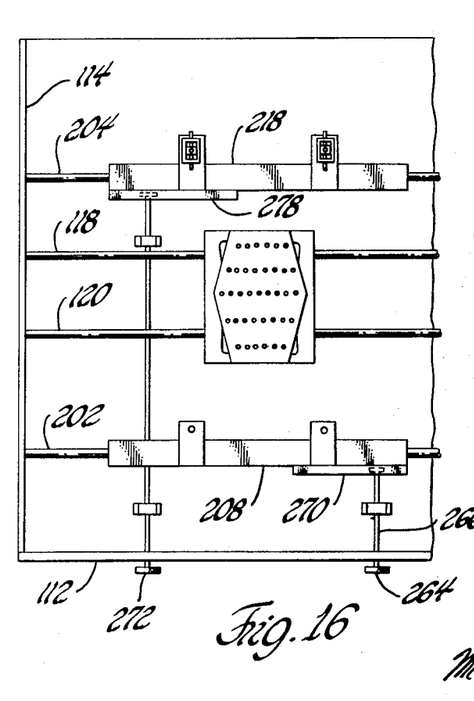
FIG. 16 is a plan view of the cutter with the track table and the cross tables removed.

In order to impart motion to the carrier 208 along the way 202, a manual control knob 264 is provided on the front panel 112. As shown in FIGS. 8 and 16, the control knob 264 is drivingly connected to a shaft 266 mounted in suitably bearings and connected with a drive pinion 268. The drive pinion meshes with a rack gear 270, which is fixedly mounted on the side of the carrier 208. In a similar manner motion is imparted to the carrier 218 and hence to the rear of the cross tables 176 and 178. As shown in FIGS. 10 and 16, a control knob 272 is mounted on the front panel 112 and is drivingly connected to a shaft 274, mounted in suitable bearings, and connected with a drive pinion 276. A rack gear 278 is mounted on the front side of the carrier 218 and meshes with the pinion 276 to drive the carrier on rotation of the knob 272.

As previously mentioned, with reference to FIG. 7, the lower cursor 156 and the upper cursor 154 are adjustably mounted for movement along the supporting ways 142 and 140 respectively. Motion is imparted to the lower cursor 156 by the front carrier 208. The drive connection is effected through an upstanding arm 282 on the support block 210 (see FIGS. 9 and 7). A drive pin 284 extends upwardly from the arm 282 and, as shown in FIG. 7, a bifurcated bracket 286 on the body 158 straddles the drive pin. In a similar manner the upper cursor 164 is driven by the carrier 218. For this purpose a slide block 288 (see FIGS. 9 and 7) is secured to the carrier 218 and is provided with an upstanding arm 290 having a drive pin 292 extending upwardly therefrom. The body 166 of the cursor 164 is provided with a bifurcated bracket 294 which straddles the drive pin. Thus, drive is imparted to the lower cursor 156 and the upper cursor 154 by the carriers 208 and 218 respectively.

Figure 11:
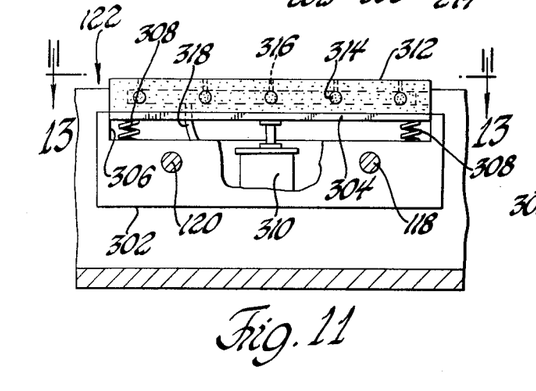
FIG. 11 shows a detail of construction of the film platen.

As stated above, the film to be cut is mounted upon a film carrier 122 which is mounted upon the ways 118 and 120. The film carrier is adapted to hold the film throughout the cutting operation and for reasons to be discussed presently, the film carrier is movable along the ways 118 and 120 and includes means for moving the film in a direction perpendicular to its plane, i.e., transverse to the plane of the ways 118 and 120. As shown in FIG. 11, the film carrier 122 includes a carriage 302, having suitable bearings therein to receive the ways 118 and 120. A platform 304 is mounted on the carriage 302 and is adapted to be extended or retracted, i.e., raised or lowered, with respect to the carriage. For this purpose the platform is mounted within an opening or recess 306 in the upper part of the carriage and is supported thereon by a set of spring loaded plungers 308. An electromagnet 310 has a field member secured to the carriage and has an armature secured to the underside of the platform 304. A film platen 312 is mounted on the upper surface of the platform and is movable therewith. Accordingly, when the electromagnet 310 is energized, the film platen is retracted into the recess 306, so that the upper surface thereof is flush with the upper surface of the carriage. When the electromagnet 310 is deenergized the film platen 312 is extended by the spring loaded plungers 308 so that the upper surface of the platen is flush with the upper surface of the track table 126.

Figure 13:
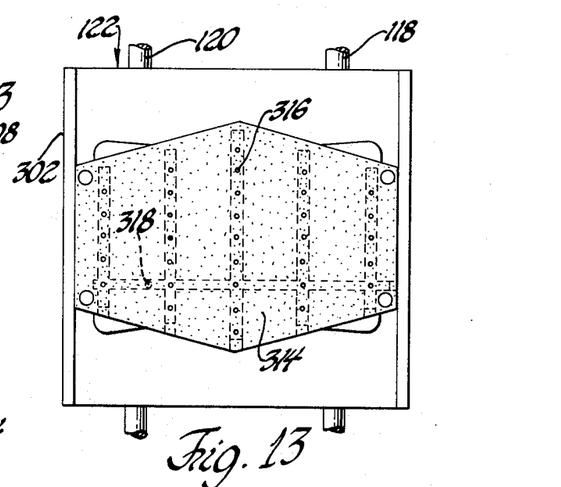
FIG. 13 shows details of the film platen.

In order to secure the film to be cut to the film platen 312, the platen is provided with vacuum holding means as shown in FIGS. 11 and 13. The platen 312 is suitably formed of a thick plate of plastic having a hexagonal configuration which, as will appear hereinafter, provides clearance for the right and left cross tables 176 and 178 when they are positioned for cutting the angle sides of the film. The film platen is provided with internal bores or passages 314, which are in communication with the upper surface of the platen through a multiplicity of small transverse passages 316. The platen is provided with a vacuum line connection 318 which communicates with the passages 314 and is also connected in a suitable manner to a vacuum source.

When the film platen 312 is in an extended position for holding the film to be cut on the surface of the track table 126, it is desirable to secure the film also to the track table. For this purpose the track table 126, as shown in FIGS. 9 and 17, is provided with vacuum holding means similar to that of the platen. The track table is provided on the arm 130 with plural vacuum passages 322 which extend from a vacuum line fitting 324 to the upper surface of the track table. Similarly, the arm 132 of the track table is provided with plural vacuum passages 326 which extend from a vacuum line fitting 328 to the upper surface of the track table. The vacuum line fittings 324 and 328 are connected to a source of vacuum in a suitable manner. In a similar manner it is desirable to secure the film during the cutting of the angle sides to the right and left cross tables 176 and 178. As shown in FIGS. 17 and 15, the left cross table 176 is provided with vacuum passages 332 which extend from vacuum line fittings 334 to the upper surface of the table. Similarly, the right cross table is provided with vacuum passages 338 which are connected with vacuum line fittings 340. The vacuum line fittings are connected with a suitable source of vacuum.

The cutting apparatus as described above includes the track table 126 which in the initial condition for performing a cutting operation, is positioned on the left side of the support table 116 so that it overlies the left and right cross tables 176 and 178 with the cutter head 144 disposed below the ways 186 and 234. The tables are shown in this condition in FIG. 7 and the track table is latched in this position by mechanism as shown in FIG. 17. A pivotal latch 342 is mounted on the side wall of the track table 126 and is spring loaded toward a latching position by a spring 344 which coacts with the latch through a push pin 346. A keeper 348 is mounted on the side panel 114 of the support table 110 and is engaged by the latch 342 when the track table is in its initial condition at the left side of the support table. In this condition with the latch engaging the keeper, the cutter head 144 may be moved along the ways 140 and 142 without disturbing the position of the track table on its ways 118 and 120. When the cutter head 144 is moved to the extreme right hand position on its ways 140 and 142 it engages a dog 350 on the push pin 346 and retracts the same against the spring 344, causing the latch 342 to be released from the keeper 348. A microswitch 352 is mounted on the end bracket of the track table 126 and is engaged by the cutter head 144 when it reaches the end of its travel at the right side of the track table. The microswitch 352, which controls the vacuum lines to the track table is actuated simultaneously with the release of the latch 342. When the latch 342 is released the track table 126 is movable along its ways 118 and 120 to the right hand side of the support table 110 to the position shown in FIG. 17. Another microswitch 354 is mounted on the support table 110, as shown in FIG. 17 in a position to be engaged by the track table as it approaches the extreme right hand position on the support table. The microswitch 354 controls the energization of the solenoid 310 which is effective to retract the film platen as previously described, so that the film is positioned on the cross tables 176 and 178. As shown in FIG. 9, an additional microswitch 360 is mounted on the arm 282 for actuation by the lower cursor 156 for reasons which will be given later.

Figure 24:
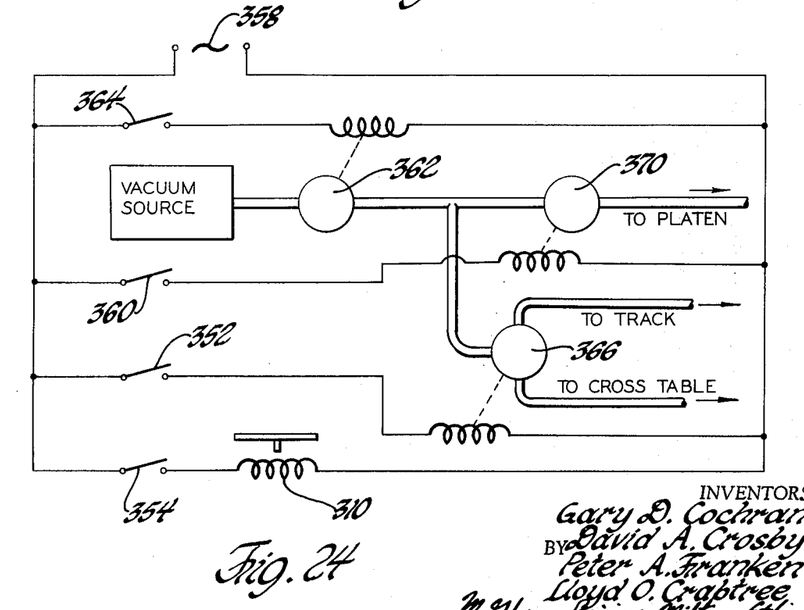
FIG. 24 is a schematic diagram of the control system.

Referring now to FIG. 24, the semiautomatic control system is shown in schematic diagram. The control system is energized by a voltage source 358, suitably the alternating current supply lines. In order to control the supply of vacuum to the film platen 312, a solenoid actuated valve 362 is connected between the source of vacuum and the inlet of a vacuum valve 370 which has an outlet connected to the vacuum fitting on the platen. The energizing winding of the valve 362 is serially connected with a manual switch 364 across the voltage source 358. When the switch 364 is closed the solenoid is energized and the valve is opened. The valve 370 is actuated by a solenoid winding which is serially connected with the microswitch 360. When switch 360 is closed the valve 370 is closed. In order to connect and disconnect the vacuum source with the vacuum fittings on the track table and cross tables, the solenoid actuated two-way vacuum valve 366 is provided. The valve 366 has an inlet connected with the vacuum source through valve 362 and a first outlet connected with the track table fittings and a second outlet connected with the cross table fittings. The solenoid winding of the valve is connected in series with the microswitch 352 across the voltage source 358. When the switch is open the solenoid is deenergzied and the vacuum valve 366 is open between the vacuum source and the track table fittings and it is closed between the vacuum source and the cross table fittings. When the switch 352 is closed, the valve is open between the vacuum source and the cross table fittings and is closed between the source and the track table fittings. In order to control the position of the film platen 312, the solenoid winding 310 is connected in series with the microswitch 354 across the voltage source 358. When the switch 354 is open the platen is in its extended position and when the switch is closed, the winding 310 is energized and the platen is drawn by the armature to its retracted position.

The operation of the cutter will be described with reference to FIGS. 7 and 17. When a film is to be cut the cutting apparatus is placed in its initial condition in which the track table 126 is positioned over the cross tables 176 and 178 and the track table is held in position by the latch 342. The cutter head 144 is positioned at the left side of the track table. The upper cursor 154 and the lower cursor 156 are temporarily removed from the track table and the film platen 312 is in its extended position, i.e., the surface thereof is flush with the surface of the track table. The film 124 to be cut is positioned on the track table with the track marks aligned with the fiduciary line 136 and then the manual switch 364 is closed to energize the vacuum valve 362 and admit vacuum to the vacuum passages of the platen 312. At the same time the valve 362 admits vacuum to the inlet of the vacuum valve 366 which is deenergized and admits vacuum to the vacuum passages of the track table. Accordingly, the film is securely held by the vacuum to the surface of the film platen and the track table. The upper cursor 154 and the lower cursor 156 are then replaced on the track table, as shown in FIG. 7. The control knob 264 is rotated clockwise or counterclockwise, as required, to move the carrier 208, by means of the rack and pinion drive, until the lower cursor 156 is positioned with reference line 162 thereof overlying the righthand track mark on the film 124. Either separately, or concurrently, the control knob 272 is rotated in the direction required to move the carrier 218 and hence the upper cursor 154 so that the reference mark 170 thereon is positioned over the cross mark on the film 124. Depending upon the degree of angularity of the angle sides of the parallelogram to be cut, and depending upon the initial positioning of the film on the track table, one of the cross tables 176 or 178 may engage the film carrier 122 in the movement of the cross table to the desired position for the cursor. If so, the carrier 122, being movably mounted on the ways 118 and 120 is moved concurrently with the cross table. In order to permit this movement of the film carrier 122 while the film remains fixed to the track table, the vacuum line to the film platen is interrupted. This occurs when the lower cursor 156 is replaced on the track table with the bifurcated bracket 286 astride the pin 284, since the bracket 286 engages the microswitch 360 which energizes the vacuum valve 370 and disconnects the vacuum passages in the platen from the vacuum source.

With the upper and lower cursors 154 and 156 respectively, properly positioned on the film 124, the left and right cross tables 176 and 178 respectively, are properly positioned to cut the angle sides of the parallelogram in accordance with the marks on the film. Accordingly, the cursors 154 and 156 may be removed from the track table and laid aside. When cursor 156 is removed the microswitch 360 is opened and the valve 370 is deenergized and vacuum is readmitted to the vacuum passages in the film platen 312. Accordingly, the film is secured to the film platen and to the track table. The cutter head 144 is moved on its ways 140 and 142 beneath the ways 186 and 234 across the film, thereby causing the cutter wheels 146 and 148 to traverse the respective cutting edges in the track table and thereby cut the reference sides on the film to make the parallelogram. When the cutter head 144 reaches the right hand side of the track table 126 the latch 342 is released and simultaneously the microswitch 352 is closed, thereby energizing the vacuum valve 366. When the valve 366 is energized, the vacuum source is disconnected from the track table and the film is released therefrom. At the same time, the vacuum valve 366 connects the vacuum source with the cross tables. The track table is moved to the right-hand side of the support table and engages the microswitch 354 which is closed thereby and energizes the relay 310. Accordingly, the film platen 312 is retracted, lowering the film to the level of the cross tables and since the vacuum passages therein have already been connected with the vacuum source, the film is securely held against the cross tables and against the film platen. With the film in this position, the cutters 188 and 236 on the cross tables 176 and 178 respectively, are drawn forward on the respective ways 186 and 234 across the film 124. The cutting wheels with the respective cutters 188 and 236 ride in the cutter tracks 194 and 240 and the film is cut along the angle sides to complete the formation of the parallelogram. At this point the manual switch 364 is opened to disconnect the vacuum source from the vacuum passages in the film platen and the cross tables and film in the form of the parallelogram is removed therefrom. The cutting apparatus is then placed in its initial condition for the performance of the next cycle of the cutting operation.

Figure 18:
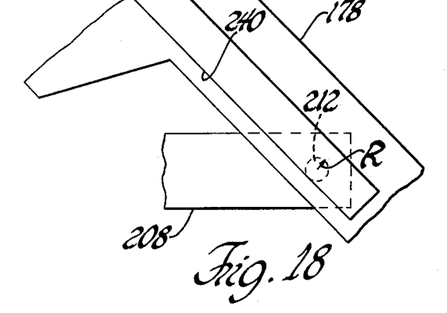
FIG. 18 shows the relationship of the cutting edge on the right cross table with the pivotal mount thereof.
Figure 19:
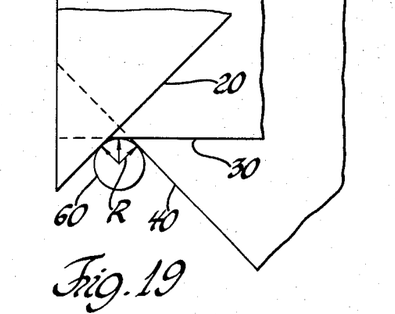
FIG. 19 shows alternate positions of the cutting edge.

As mentioned above, in accordance with this invention, it has been found that proper alignment of the films for viewing the radiographs depends upon the proper correlation of the mechanism in the cutting apparatus and the mechanism in the viewing apparatus. In the viewer, as represented in FIG. 4, described above, in an idealized system the proper alignment could be achieved by cutting the films so that with the images on all of the films of a given point overlying each other when stacked in the viewer, the edges of the films on a horizontal line through the point would all overly each other. Cutting of the film in this manner could be accomplished in the apparatus described above by mounting the cutting edge on each of the cross tables so that the cutting edge extends through the axes of the pivot pins for the respective cross table. The difficulty with this arrangement is that it would require that the cam element in the viewer be reduced to a dimensionless point (as might be approximated by a knife-edge cam extending transversely of this film stack), so that the cam element would engage the edges of the films on the same horizontal line extending through the image of the given point. As a practical matter, each of the cam elements in the viewer must have a substantial dimension and it is preferably formed with a cam surface forming a circular arc having a given radius R. Consequently, the cam element will engage each film edge at a different point of tangency which causes different offsets of the films from the center of the cam along the direction of the reference side so that the idealized system mentioned above cannot be achieved. However, the required relationship of the films in the viewer is provided in a manner represented in FIGS. 18 and 19. FIG. 19 shows the relationship among the films and the cam element in a viewer. In particular FIG. 19 shows the lower left-hand corners of parallelogram films 20, 30 and 40, such as were described above. These films are stacked on top of each other in a viewer such as that shown in FIG. 4, with the angle side of each film in engagement with the cam element 60, suitably of circular cross-section and having a radius R. It is noted that the edges of the films are offset from the center of the cam element 60 by an amount which depends upon the angularity of the angle sides of the parallelogram. in particular, the offset for the films varies in accordance with the cosine of the angle between the angle side of the film and the altitude of the parallelogram. Since the offset distance is different for each different film in a set, provision must be made in the cutting apparatus to compensate for this offset in order to achieve proper alignment in the viewer. It has been found that the proper compensation is achieved with a pivot arrangement in the cutting apparatus, as illustrated in FIG. 18. In FIG. 18 a fragmentary portion of the cutter is shown, including the right cross table 178 and the front carrier 208, which is movable on the way 202. As described with reference to FIGS. 10 and 17, the cross table 178 is pivotally mounted on the carrier 208 by a pivot pin 212. As illustrated in FIG. 19, the proper compensation for the offset which occurs in the viewer is achieved when the pivot pin 212 is of the same radius as the radius of curvature of the cam element 60, and when the cutting edge 240 is tangent to the pin 248 on the inboard side thereof. Accordingly, the two pivot pins 248 and 256 for the cross table 178 and the two pivot pins 212 and 222 for the cross table 176 have a radius R and the cutting edges 240 and 194 of the right and left cross tables respectively, are tangent to the respective pivot pins. This relationship provides the proper compensation by offsetting the cut angle sides of each film in an inboard direction by an amount which is just equal to the spacing of the edges of the films from the center of the cam element 60 in the viewer.

Figures 20, 21, 22:
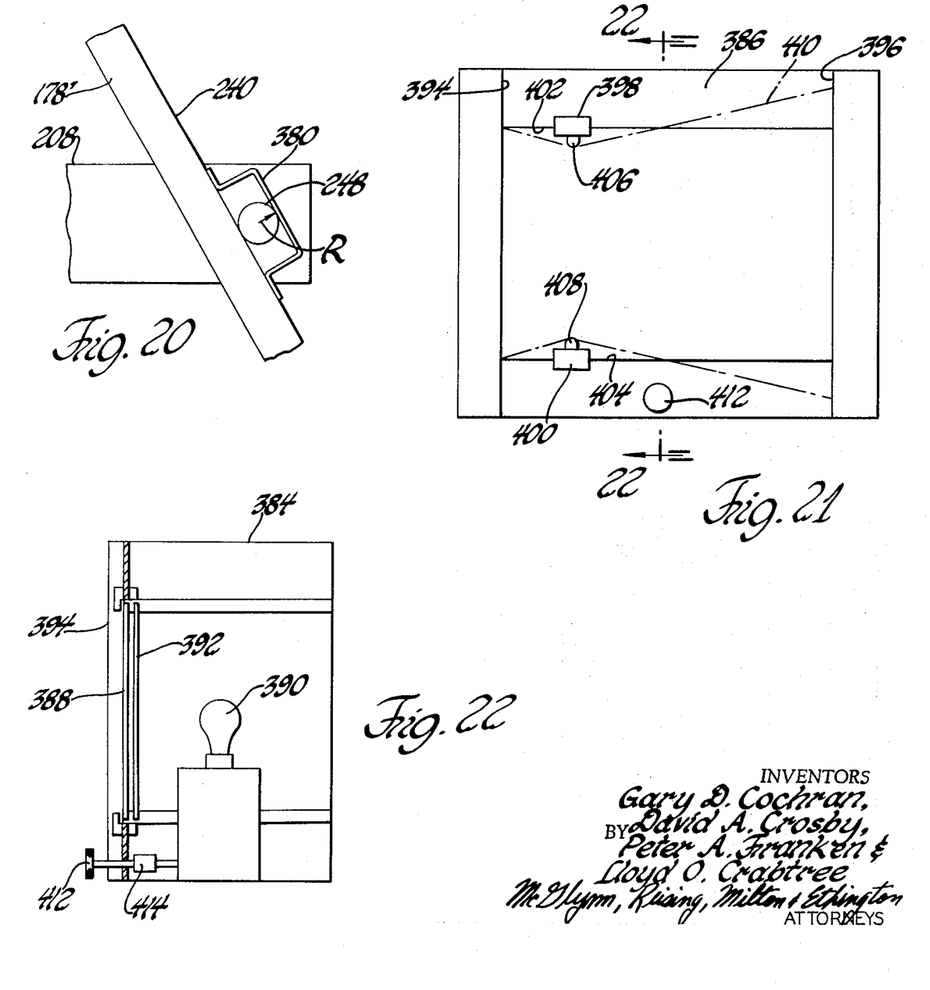
FIG. 20 shows an alternate construction of a pivotal mount for the cross tables.
FIG. 21 is an elevation view of the radiograph viewer.
FIG. 22 is a view taken on lines 22—22 of FIG. 21.

An alternative construction for the pivotal mounting of the cross tables is shown in FIG. 20. The cross table 178' is pivotally mounted on the carrier 208 by a pivot pin 248 and is retained in engagement therewith by a resilient guide bracket 380, which is suitably secured at both ends to the cross table 178'. The cross table is provided with a cutting edge 240 which is held tangent to the pin 248 at the inboard side thereof, while the pin and bracket function as a pin and slot connection. This pivotal mounting arrangement for the cross tables 176 and 178 may be used instead of the mountings for pivot pins 248 and 256, as shown in FIG. 8, and instead of the mountings for pivot pins 212 and 226, as shown in FIG. 10.

The radiograph viewer for films cut into parallelograms with the cutting apparatus described above is shown in FIGS. 21, 22 and 23. The viewer comprises a housing 384 including a front panel 386, having a rectangular glass plate 388 mounted therein. The glass plate is preferably a light diffusing type material and the light source 390 is mounted within the housing and adapted to be electrically energized. The heat absorbing glass plate 392 is disposed between the light source 390 and the diffusing glass 388. The front panel 386 is provided with a pair of guides 394 and 396 which extend vertically and are spaced apart a distance equal to the altitude of the parallelogram films. The pair of runners 398 and 400 are mounted on the face of the panel in respective guide channels 402 and 404 which extend laterally across the width of the glass plate 388. The runners 398 and 400 are disposed opposite each other in a vertical plane and include, respectively, cam elements 406 and 408 for movement in unison across the width of the plate. The cam elements 406 and 408 each have a radius of curvature R equal to the pivot pin radius in the cutting apparatus as discussed above and the cam elements are spaced apart a distance equal to the width of the parallelogram films. Thus a set 410 of parallelogram films, which are superimposed or stacked together in any desired order, may be placed on the face of the viewer with the reference sides disposed between and engaging the guides 394 and 396 and with the angle sides disposed between and engaged by the cam elements 406 and 408.

Figure 23:
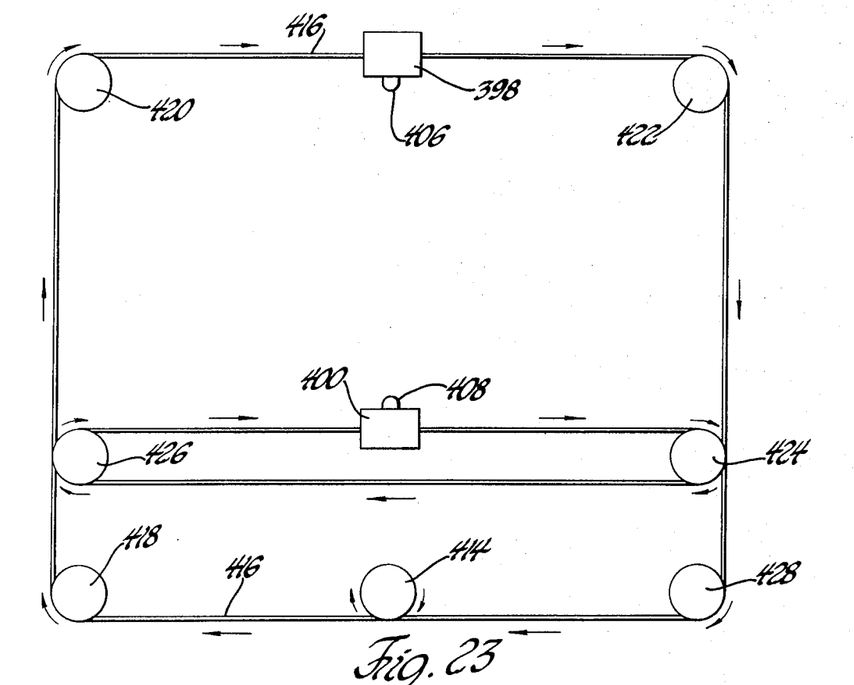
FIG. 23 shows the film shift mechanism of the radiograph viewer.

In order to move the runners 398 and 400 in unison across the glass plate 388 for the purpose of shifting the films in set 410, a cable drive including a manual knob 412 on the front panel is provided. As shown in FIGS. 22 and 23, the knob 412 is connected by shaft to a drum or drive pulley 414 and a continuous drive cable 416 is affixed thereto. The drive cable extends from the drum 414 to a lower pulley 418 and thence upwardly to a pulley 420 and across to an upper pulley 422. From the upper pulley 422 the cable continues downwardly to an intermediate pulley 424 and thence across to a pulley 426 and back across to the pulley 424. From the intermediate pulley 424 the cable then extends downwardly to the lower pulley 428 and returns to the drum 414. The upper runner 398 is fixedly connected to the cable 416 in the span between upper pulleys 420 and 422. The lower runner 400 is fixedly attached to the cable 416 in the span between the intermediate pulleys 424 and 426 and directly below the runner 398. When the knob 412 is rotated in a clockwise direction the runners 398 and 400 move in unison from left to right and when the knob is rotated in a counterclockwise direction the runners move from right to left.

In operation of the viewer the set 410 of parallelogram films is stacked in any order and placed on the front panel of the viewer between the guides 394 and 396 and between the cam elements 406 and 408. With the light source 390 energized the films are backlighted and the radiographs thereon may be viewed. The image of any selected plane within the object may be brought into virtual focus by rotating the manual knob 412. This rotation of the knob causes the runners 398 and 400 to move laterally and the cam elements 406 and 408 thereon are effective to shift the films in the set 410 relative to each other, whereby the desired plane may be selected for viewing.

Although the description of this invention has been given with reference to a particular embodiment thereof, it is not to be construed in a limiting sense. Many variations and modifications will now occur to those skilled in the art. For a definition of the invention, reference is made to the appended claims.

We claim:

1. Apparatus for making a set of parallelograms of constant altitude and width and of variable angle comprising;

a first pair of ways extending parallel to each other, first and second carriers mounted on the first and second ways respectively and being adjustably positionable relative to each other in the direction of the ways, a pair of link members extending transversely of the ways, each link member being mounted on the first carrier and the second carrier by a pivotal connection, said pivotal connections on the first carrier being spaced apart the same distance as the pivotal connections on the second carrier, and a lost motion connection in each of said link members whereby the angles of said parallelograms may vary from one to another.

2. The invention as defined in claim 1 wherein both of said carriers are movably mounted on said ways and are adapted for movement in the direction of said ways.

3. The invention as defined in claim 2 including a support means fixedly connected with said ways and adapted to receive a workpiece having first and second index marks thereon, first and second cursors mounted on the first and second carriers respectively for movement therewith, each of said cursors including a pointer adapted for alignment with one of said index marks for use in selecting the angle of a parallelogram.

4. The invention as defined in claim 3 and further including a first pair of cutting guides extending parallel to said ways and a second pair of cutter guides extending parallel to said link members.

5. A cutter for radiograph films for use in dynamic tomography and having first indicia thereon defining a line having a direction relative to the image which corresponds to the direction of motion of the source relative to the object between exposures in making successive radiograph films and having second indicia thereon indicative of the angle of exposure of the radiograph film, said cutter comprising a support member having means defining a fiduciary line thereon, said support member being adapted to receive a film with the first indicia thereon aligned with the fiduciary line first cutter guide means on said support member extending in a direction parallel to said fiduciary line for use in cutting said film with a first pair of parallel sides, a first carrier mounted on the support member, a second carrier mounted on the support member and being movable in a direction parallel to the fiduciary line, a second cutter guide means extending between the carriers and a pivotal connection between the second cutter guide means and each of the carriers whereby said second carrier may be positioned in accordance with said second indicia so that said cutter guide means extends in a direction related to the angle of exposure.

6. The invention as defined in claim 5 wherein said first carrier is movably mounted on the support member and is movably mounted in a direction parallel to the fiduciary line.

7. The invention as defined in claim 6 and further including first and second cursors connected respectively with the first and second carriers for movement therewith, said cursors including respective indicators thereon and being disposed adjacent said support member for alignment with the indicia on said film.

8. A parallelogram cutter for radiograph films for use in dynamic tomography and having first indicia thereon defining a line having a direction relative to the image which corresponds to the direction of motion of the source relative to the object between exposures in making successive radiograph films and having second indicia thereon indicative of the angles of a parallelogram, said cutter comprising a support member having means defining a fiduciary line thereon, said support member being adapted to receive a film with the first indicia thereon aligned with the fiduciary line, first cutter guide means on said support member extending in a direction parallel to said fiduciary line for use in cutting said film with a first pair of parallel sides of said parallelogram, a first carrier mounted on the support member, second cutter guide means pivotally supported on said first carrier, a second carrier mounted on the support means and being movable in a direction parallel to the fiduciary line, the second cutter guide means being pivotally connected with the second carrier and movable therewith, a lost motion connection between said second cutter guide means and one of said carriers whereby said second carrier may be positioned in accordance with said second indicia so that said cutter guide means extends in the direction of the other pair of sides of said parallelogram.

9. The invention as defined in claim 8 wherein first and second cursors are connected repsectively with the first and second carriers for movement therewith, said cursors including respective indicators thereon and being disposed adjacent said support member for alignment with the indicia on said film.

10. Apparatus for cutting sheet material into parallelograms of constant altitude and predetermined variable angles said apparatus comprising a support member having means defining a fiduciary line thereon, said support member being adapted to receive said sheet material in a predetermined alignment with the fiduciary line, a first cutter guide on said support member and extending in a direction parallel to said fiduciary line, first cutting means operatively connected with the first cutter guide for cutting said sheet material with a first pair of parallel sides, a movable carrier mounted on said support member, means constraining the movement of the carrier to a direction parallel to said fiduciary line, a second cutter guide pivotally supported on said movable carrier and being angularly adjustable to extend at a selectable angle relative to the fiduciary line, and second cutting means operatively connected with the second cutter guide for cutting said sheet material with a second pair of parallel sides at a predetermined angle relative to the first pair of parallel sides.

11. Apparatus for cutting sheet material into parallelograms having constant altitude and width and having variable angles with data thereon in a predetermined orientation and position, said sheet material including first indicia defining the orientation of said data and including second indicia defining position of said data and the angle of a parallelogram, said apparatus comprising a support member including means defining a fiduciary line, said support member being adapted to receive a piece of sheet material with the first indicia thereon aligned with said fiduciary line, first cutting means having a pair of cutting paths extending parallel to said fiduciary line and being spaced a fixed distance apart for cutting said piece of sheet material with a first pair of parallel sides at a given altitude, a first pair of oppositely disposed parallel arms fixed in position parallel to said fiduciary line, a separate carrier mounted on each of the first pair of parallel arms for movement therealong, a second pair of parallel arms each of which has a pivotal connection with each of the carriers, said pivotal connections on each carrier being spaced a fixed distance apart, one of said pivotal connections on each of the second pair of arms being movable in the direction of the second pair of arms independently of the other pivotal connections thereon, whereby the second pair of arms may be adjusted in angular position and in translational position relative to said first pair of arms according to said second indicia, and a second cutting means having a second pair of cutting paths extending parallel to the second pair of arms for cutting said piece of sheet material with a second pair of parallel sides at a given width.

12. The invention as defined in claim 11 wherein one of the second pair of cutting paths of the second cutting means is spaced inboard of the pivot axes of the pivotal connections on one of the second pair of arms by a distance equal to the pivot radius and the other of the second pair of cutting paths is spaced inboard of the pivotal axes of the pivotal connections on the other of the second pair of arms by a distance equal to the pivot radius of said pivotal connections.

13. The invention as defined in claim 12 further including first and second cursors connected repsectively with the first and second carriers for movement therewith, said cursors including respective indicators thereon and being disposed adjacent said support member for alignment with the indicia on said film.

14. The invention as defined in claim 13 wherein said first cutting means has a support surface for said sheet material disposed in one plane and wherein said second cutting means has a support surface for said sheet material in another plane, a support platen for said sheet material having a support surface movable between said first and second planes, and means responsive to the completion of actuation of one of said cutting means for causing said support platen to move from one plane to the other.

15. The invention as defined in claim 14 wherein said support platen and said first and second support surfaces are provided with selectively operable vacuum holding means for said sheet material, and vacuum control means responsive to the completion of actuation of one of the cutting means for releasing the vacuum holding means on the one cutting means and actuating the vacuum holding means on the other cutting means.

16. The invention as defined in claim 15, including manual control means for actuating the vacuum holding means to the support platen, manual means for manipulating said carriers for adjusting the angle of the parallelogram to be cut, manual means operative to actuate the vacuum holding means to said first cutting means and means responsive to the completion of the actuation of the first cutting means for moving said support platen from the first plane to the second plane and for actuating said vacuum holding means of the second cutting means.

* * * * *